United States Patent [19]

Narumi et al.

[11] 4,396,033
[45] Aug. 2, 1983

[54] FLOW VOLUME CONTROL DEVICE FOR A POWER ASSISTED STEERING DEVICE

[75] Inventors: Tadataka Narumi, Kariya; Akihiko Sato, Okazaki; Satoshi Suto, Chiryu, all of Japan

[73] Assignee: Toyoda Koki Kabushiki Kaisha, Aichi, Japan

[21] Appl. No.: 182,580

[22] Filed: Aug. 29, 1980

[30] Foreign Application Priority Data

Aug. 31, 1979 [JP] Japan .................. 54-112226

[51] Int. Cl.³ .................. F15B 13/04
[52] U.S. Cl. .................. 137/117; 417/300; 417/303; 417/307
[58] Field of Search .............. 417/300, 303, 307, 310; 137/117

[56] References Cited

U.S. PATENT DOCUMENTS

| | | | |
|---|---|---|---|
| 3,415,226 | 12/1968 | Brady et al. | 137/117 |
| 3,426,785 | 2/1969 | Brady et al. | 137/117 |
| 3,547,559 | 12/1970 | Tittmann | 417/300 X |
| 3,620,646 | 11/1971 | Stevenson | 137/117 X |
| 4,047,846 | 9/1977 | Komamura | 417/300 |

Primary Examiner—Richard E. Gluck
Attorney, Agent, or Firm—Oblon, Fisher, Spivak, McClelland & Maier

[57] ABSTRACT

A flow volume control device for a power assisted steering device having a main control valve device, whose main valve spool is movable to establish the communication of an inlet passage with a bypass passage when the flow rate of pressurized fluid supplied from an engine-driven pump to the steering device through the inlet passage and first and second throttle passages disposed in parallel relation exceeds a predetermined value. For safe driving at a high speed, an auxiliary control valve device is further provided, whose auxiliary valve spool is moved to close the second throttle passage when high-speed driving causes pressurized fluid from the pump to increase in volume, to thereby bring about a predetermined pressure drop across said inlet passage.

8 Claims, 5 Drawing Figures

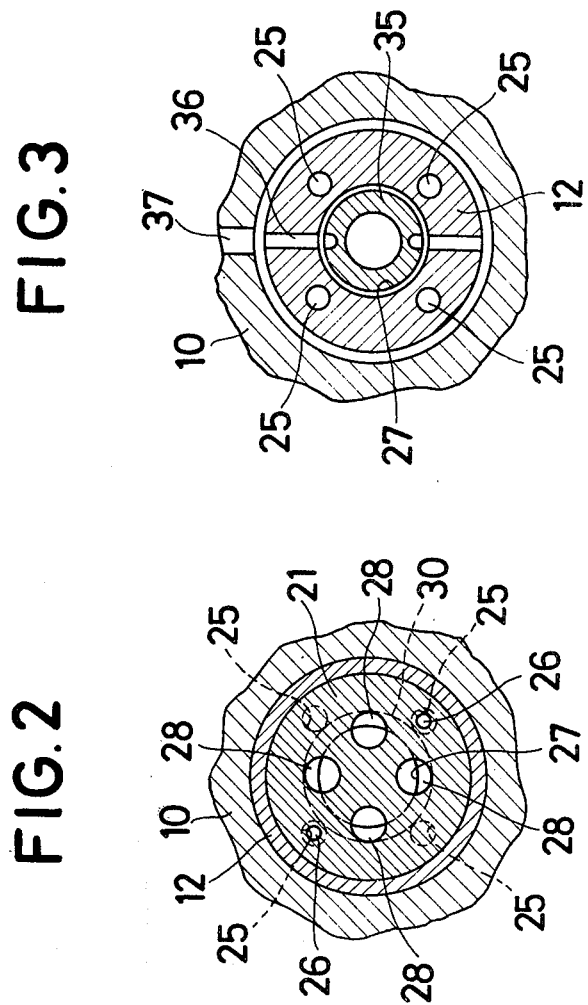

FLOW VOLUME CONTROL DEVICE FOR A POWER ASSISTED STEERING DEVICE

BACKGROUND OF THE INVENTION

1. Field of the Invention

The present invention relates in general to a flow volume control device for delivering operating fluid from an engine-driven pump to a power assisted steering device through a throttle element and for returning an excess part of the fluid to an inlet area of the pump by way of the bypass passage. More particularly, it relates to a flow volume control device of the type mentioned above which is capable of decreasing the volume of fluid supplied to the steering device as the rotational speed of the pump increases.

2. Description of the Prior Art

Generally, a pump device used together with a power assisted steering device in a motor vehicle is provided with a flow volume control valve. The degree of opening of the valve is increased as an increase in the driving speed of the motor vehicle causes the rotational speed of a pump of the pump device to increase. This results in bypassing more of the pressurized fluid from an exhaust area to a suction area of the pump so that the flow volume of pressurized fluid to the steering device can be maintained approximately constant.

It is a general requirement to increase the steering reaction felt by the vehicle driver during high speed driving. To this end, an attempt has been made to decrease the flow volume of fluid to the steering device as the rotational speed of the pump is further increased beyond a predetermined value.

However, most known flow volume control devices of this type are designed to variably control the opening of a throttle passage in dependence upon the displacement of a valve spool. This makes it possible to obtain a predetermined characteristic of flow volume drop while no load is applied to the power assisted steering device (that is, while the same is not manipulated), but permits the valve spool to restrict the flow of the bypass fluid when the manipulation of the steering device causes a pressure elevation in the fluid system. The restriction of the bypass flow, however, causes the volume of fluid to the steering device to increase rather than decrease with an undesirable result that the strengthened steering reaction is weakened.

SUMMARY OF THE INVENTION

Accordingly, it is a primary object of the present invention to provide a flow volume control device for a power assisted steering device, capable of making a vehicle driver feel a steering reaction sufficient for safe driving at a high speed.

Another object of the present invention is to provide an improved flow volume control device wherein the volume of fluid to a power assisted steering device, while decreasing with an increase in the rotational speed of an engine-driven pump, can be prevented from increasing due to an increase in the load pressure applied to the steering device.

A further object of the present invention is the provision of an improved flow volume control device wherein a small pressure drop generated across an inlet passage when pressurized fluid led from an engine-driven pump to the inlet passage is increased in volume is utilized to decrease the volume of pressurized fluid to a power assisted steering device so that the load applied to the pump can be reduced.

An additional object of the present invention is to provide an improved flow volume control device for a power assisted steering device of the character set forth above which is easy to maintain.

Briefly, according to the present invention, there is provided a flow volume control device, which is provided with an auxiliary control valve device in addition to a main control valve device. The main control valve device includes a main valve spool, which is movable to establish the communication of an inlet passage with a bypass passage when the flow rate of pressurized fluid supplied from an engine-driven pump to the inlet passage exceeds a predetermined value. Thus, an excess part of the pressurized fluid is returned through the bypass passage directly to the pump without being delivered to the throttle passage means communicating with a power assisted steering device.

The auxiliary control valve device includes an auxiliary valve spool. This spool cooperates with the throttle passage means and is movable in response to a pressure drop generated across the inlet passage when high-speed driving causes the volume of pressurized fluid from the pump to increase. The auxiliary valve spool, when so moved, acts to substantially diminish the opening of the throttle passage means to thereby decrease the volume of pressurized fluid delivered to the steering device. Accordingly, during high speed driving, the volume of pressurized fluid delivered to the steering device can be maintained at a decreased level without being increased even when the manipulation of the steering device brings about an increase in the load pressure applied thereto, so that a vehicle driver can feel a strengthened steering reaction sufficient for safe driving at a high speed.

In another aspect of the present invention, the throttle passage means comprises first and second throttle passage means disposed in parallel relation with each other, one of which is closed by the auxiliary valve spool when the pressure drop across the inlet passage reaches a preselected value.

BRIEF DESCRIPTION OF THE DRAWINGS

Various other objects, features and attendant advantages of the present invention will be readily appreciated as the same becomes better understood by reference to the following detailed description of a preferred embodiment when considered in connection with the accompanying drawings, in which:

FIG. 2 is an enlarged, fragmentary sectional view of the control device taken along the line II—II of FIG. 1;

FIG. 3 is an enlarged, fragmentary sectional view of the control device, taken along the line III—III of FIG. 1;

DETAILED DESCRIPTION OF THE PREFERRED EMBODIMENT

Figure 1:
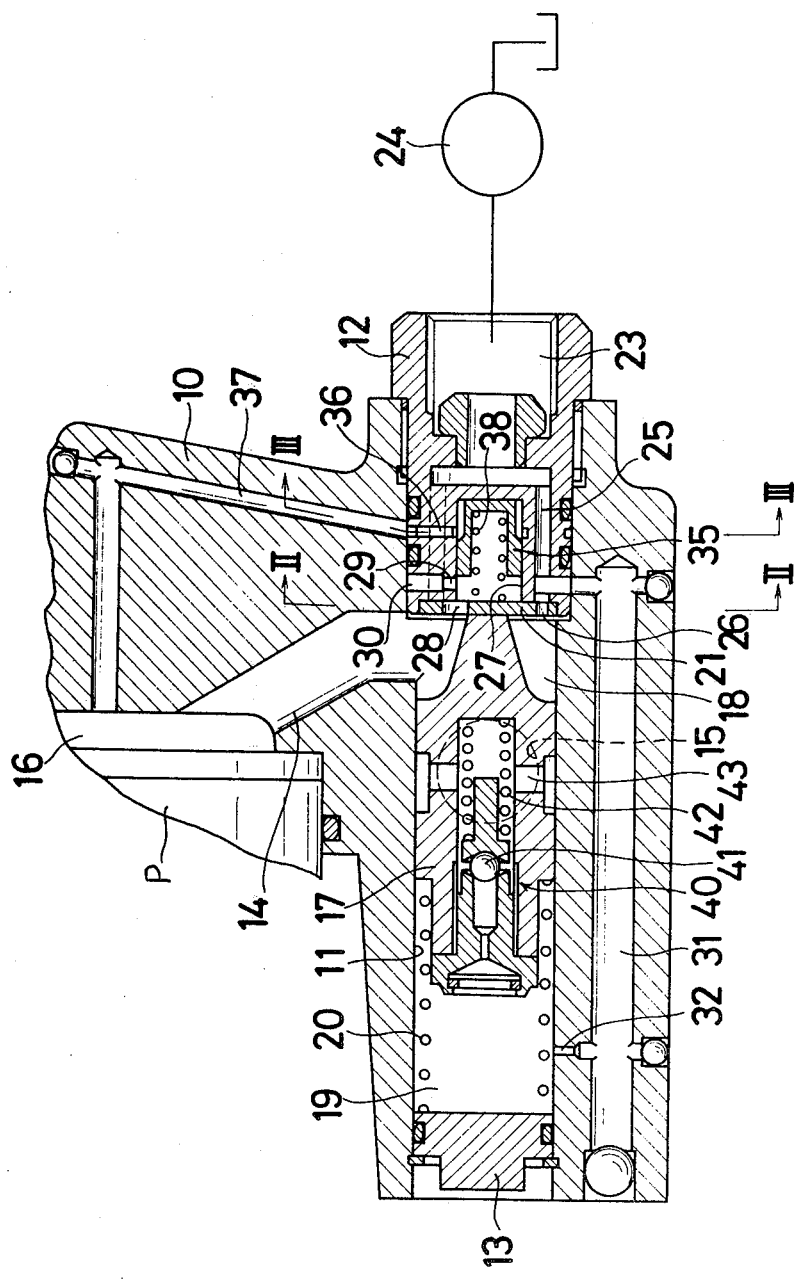
FIG. 1 is a sectional view of a flow volume control device for a power assisted steering device according to the present invention.
Figure 4:
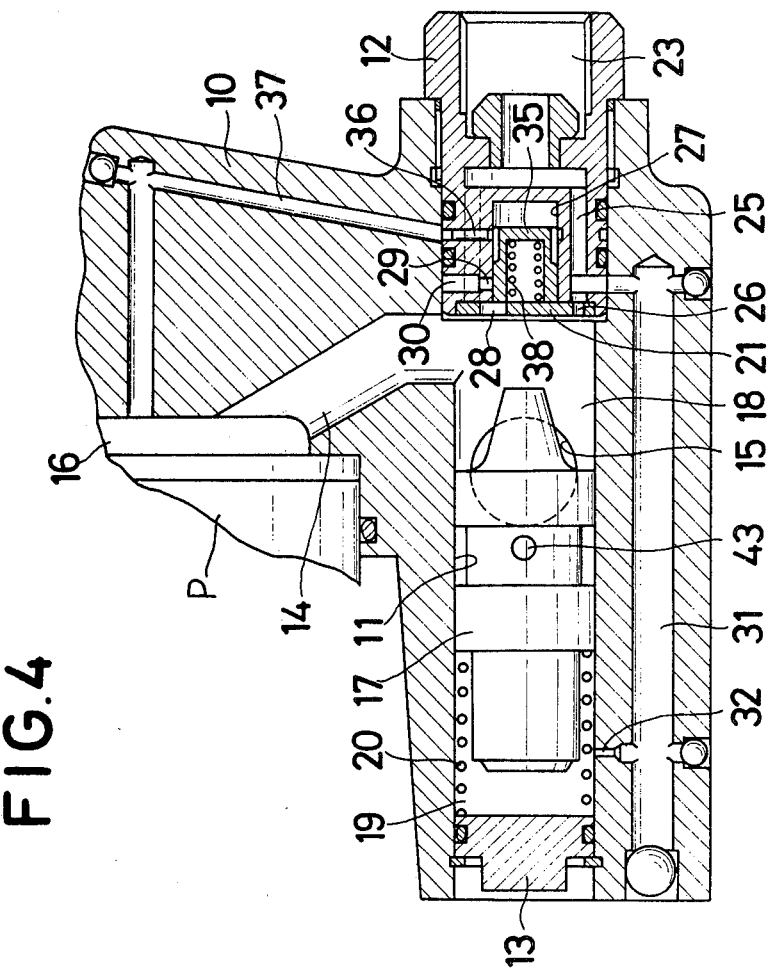
FIG. 4 is the same sectional view as FIG. 1, illustrating another mode of operation.

Referring now to the drawings, wherein like reference numerals designate like or corresponding parts throughout the several views, and particularly to FIG. 1 thereof, a housing 10 is shown having a through bore 11, which is formed for valve insertion thereinto. The through bore 11 has a valve retaining sleeve 12 threadedly engaged at one end thereof and also has a plug 13 fitted into the other end thereof. An inlet passage 14 and a bypass passage 15 are opened to the through bore 11 at respective portions axially spaced in the bore 11. The inlet passage 14 is in fluid communication with a pressure chamber 16 leading to a pump exhaust area (not shown), while the bypass passage 15 is in fluid communication with a pump suction area (not shown). It is important to note that the resistance of the inlet passage 14 is so chosen that a predetermined pressure difference is generated between upper and lower stream sides of the inlet passage 14 when the volume of pressurized fluid supplied from an engine-driven pump P into the inlet passage 14 is increased to a predetermined value.

The through bore 11 slidably contains a main control spool 17, which is axially movable for adjusting the degree of the communication between the inlet passage 14 and the bypass passage 15. First and second valve chambers 18 and 19 are defined at the opposite ends of the control spool 17. The second valve chamber 19 contains a compression spring 20 for urging the control spool 17 toward the first valve chamber 18. The compression spring 20 usually serves to maintain the control spool 17 at the position where the control spool contacts a throttle plate 21 tightly fitted into one end of the retaining sleeve 12, so as to shut off the communication of the inlet passage 14, opening to the first valve chamber 18, to the bypass passage 15. The retaining sleeve 12 is provided at its other end with an outlet or discharge port 23, which is connected with a power assisted steering device 24 incorporating therein a normal-open type servo valve device. As shown in FIGS. 2 and 3, a plurality of axial through holes 25 are formed in the retaining sleeve 12 in equiangular relation. Each of these through holes 25 communicates at its one end with the discharge port 23 and is open at its other end to the throttle plate 21. The plate 21 is formed with a plurality of first throttle passages 26, through which the first valve chamber 18 communicates with the discharge port 23.

On the center of the retaining sleeve 12, there is further formed an axial bore 27, which communicates with the first valve chamber 18 through a plurality of communication holes 28 formed on the plate 21 in equiangular relation. A second throttle passage 29, radially formed in the retaining sleeve 12, is opened to the axial bore 27 and is in fluid communication with the axial holes 25 through an annular groove 30, which is circumferentially provided on the external surface of the retaining sleeve 12 across the four axial through holes 25. Therefore, the first valve chamber 18 and the discharge port 23 can be permitted to communicate with each other through the two throttle passages 26 and 29 disposed in parallel circuit relation. However, the second throttle passage 29 is able to be closed when the pump rotational speed is increased beyond a predetermined value, as will be described later in more detail.

The annular groove 30 is also in fluid communication with one end of a relief passage 31, whose other end is in turn in fluid communication with the second valve chamber 19 via a small hole 32. The relief passage 31 and the small hole 32, formed in the housing 10, serves to lead into the second valve chamber 19 the pressurized fluid which has passed through the throttle passages 26 and 29. Since the pressures on either side of the throttle passages 26 and 29 act respectively on the opposite end surfaces of the main control spool 17, the same is axially movable in response to the pressure drop across the throttle passages 26 and 29, so that the degree of opening at the bypass passage 15 can be controlled to maintain the pressure drop across the throttle passages 26 and 29 at a predetermined value.

Into the axial bore 27 of the retaining sleeve 12, an auxiliary control spool 35 is slidably inserted for controlling the degree of opening at the second throttle passage 29. The provision of the auxiliary control spool 35 defines first and second spool chambers (not numbered) in the axial bore 27 respectively at left and right sides of the spool 35 as viewed in FIG. 1. The first spool chamber is in communication with the first valve chamber 18 through the communication hole 28, while the second spool chamber is in communication with the pressure chamber 16 through leading passages 36 and 37. This permits the opposite end surfaces of the auxiliary control spool 35 to respectively receive the pressures that act respectively at upper and lower stream sides of the inlet passage 14. The auxiliary control spool 35 is urged by a compression spring 38 toward its right stroke end to thereby normally remain in a position to open the second throttle passage 29. However, when an increase in the pump rotational speed causes the volume of fluid passing through the inlet passage 14 to increase, then it is believed that the resistance of the inlet passage 14 brings about a pressure drop between upper and lower stream sides of the inlet passage 14, that is between the pressure chamber 16 and the first valve chamber 18. It is believed that this pressure drop acts to displace the auxiliary control spool 35 against the spring 38 with a result of closing the second throttle passage 29.

Incorporated into the main control spool 17 is a pressure relief valve 40 comprising a ball valve element 41 and a compression spring 42. This valve 40 acts to permit the escape of fluid in the second valve chamber 19 to the bypass passage 15 through a relief hole 43 by moving the ball valve element 41 away from it valve seat (not numbered) when the pressure acting in the second valve chamber 19 exceeds a preselected value.

Applicants' understanding of the operation of the apparatus as constructed above will now be described. As is well known in the art, the rotation of a pump rotor by an automotive engine causes the working fluid in the reservoir to be sucked into a pump chamber, whereby pressurized fluid is fed to the pressure chamber 16 via pump exhaust port. The pressurized fluid, fed to the pressure chamber 16, is supplied to the power assisted steering device 24 through the inlet passage 14, the first and second throttle passages 26 and 29, and the discharge port 23. On the other hand, return fluid from the steering device 24 is collected in the reservoir and again, is sucked in the pump chamber.

During pump rotation at a slow speed, the main control spool 17 is in position to close the bypass passage 15 because of a small volume of pump exhaust fluid. This permit the whole volume of the pump exhaust fluid to be supplied to the steering device 24 through both the first and second throttle passages 26 and 29. However, the volume of pump exhausted fluid is increased as the pump rotational speed is heightened. Thus, the main control spool 17 is moved and opens the bypass passage 15 to maintain the difference in pressure between fluids before and behind the throttle passages 26 and 29 at a constant level. Accordingly, an excess part of the volume of the pump exhausted fluid is bypassed into the bypass passage 15, whereby the volume of pressurized fluid to the steering device 24 is controlled to maintain a predetermined value $Q_1$, as indicated in FIG. 5, which is determined in dependence upon both the throttle passages 26 and 29.

When high speed driving of the automobile causes the pump rotational speed to be further heightened with the result of an increase in the volume of pressurized fluid passing through the inlet passage 14, it is believed that a predetermined pressure difference is brought about between the pressure chamber 16 and the first valve chamber 18 which are located respectively at upper and lower stream sides of the inlet passage 14. This pressure difference is believed to be caused due to the possession by the inlet passage 14 of a resistance and acts on the auxiliary control spool 35 to generate thereon an axial thrust against the force of the spring 38. When the axial thrust increases until it overcomes the force of the spring 38, the auxiliary control spool 35 is displaced against the spring 38 to thereby close the second throttle passage 29. Accordingly, the communication of the first valve chamber 18 with the discharge port 23 is thereafter restricted only to the first throttle passages 26, and the volume of pressurized fluid supplied to the steering device 24 is decreased to a second predetermined value $Q_2$ that as indicated in FIG. 5, is determined only by the first throttle passages 26. This makes a driver feel a sufficient steering reaction which has been strengthened by decreasing the volume of pressurized fluid supplied to the steering device 24 during high speed driving so that stability in high speed driving can be enhanced.

It is important to note herein that the manipulation of the steering device 24 in high-speed driving causes a pressure corresponding to the steering resistance to be generated and that such a pressure acts on the main control spool 17 to thereby displace the same in a direction to close the bypass passage 15. On this occasion, the prior art device of the type that reduces the volume of fluid to a power assisted steering device in dependence upon the displacement of a control spool, undesirably permits the dropped volume of fluid to the steering device 24 to increase again along with an increase in load pressure to the steering device. In contradistinction thereto, it is believed that the device according to the present invention is designed to regulate the closing of one of the throttle passages 26 and 29 regardless of the displacement of the main control spool 17, but in dependence upon a pressure drop generated across the inlet passage 14, with an increase in the volume of pump exhausted fluid. In the device according to the present invention, it is therefore possible to maintain its flow volume reducing characteristic invariable in spite of an increase in load pressure applied to the power assisted steering device 24. This advantageously results in strengthening the steering reaction during high-speed driving so that stability in high-speed driving can be enhanced.

Figure 5:
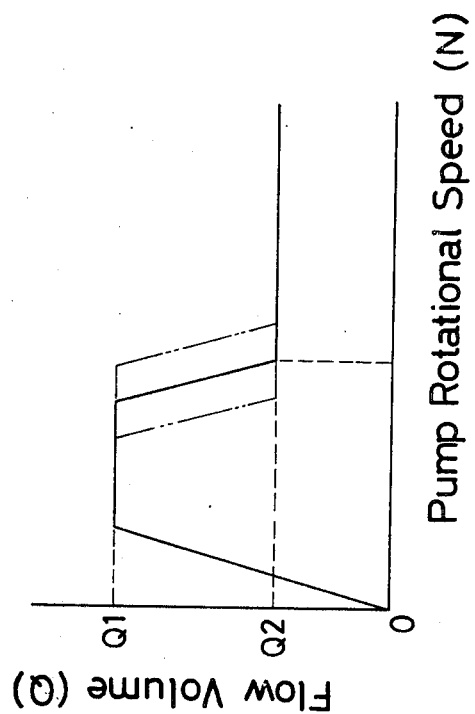
FIG. 5 is a chart illustrating the flow volume control characteristic of the device in connection with the rotational speed of an engine-driven pump.

Furthermore, in the device according to the present invention, it is also possible to vary the point where the volume of pressurized fluid supplied to the steering device 24 begins to drop, as indicated by the phantom line in FIG. 5. This can be easily achieved by changing the force of the spring 38 which acts on the auxiliary control spool 35.

Obviously, numerous modifications and variations of the present invention are possible in light of the above teachings. It is to be understood that within the scope of the appended claims, the invention may be practiced otherwise than as specifically described herein.

What is claimed as new and desired to be secured by Letters Patent of the United States is:

1. A flow volume control device for supplying pressurized fluid from an engine-driven pump to a power assisted steering device and for returning an excess part of said pressurized fluid directly to said pump, comprising:
   inlet passage means for conducting said pressurized fluid exhausted from said pump, said inlet passage means having a predetermined resistance against the flow of said pressure fluid;
   outlet passage means fluidically communicating with said steering device;
   first throttle means permanently opened;
   second throttle means provided in parallel circuit relation with said first throttle means;
   bypass passage means connected to said pump for returning said excess part of said pressurized fluid to said pump;
   main volume control means interconnected between said inlet and bypass passage means and having a main valve element movable in response to said pressurized fluid flowing from said inlet passage means to said first and second throttle means for permitting said excess part of said pressurized fluid to flow from said inlet passage means to said bypass passage means; and
   auxiliary volume control means having an auxiliary valve element which is cooperable with said second throttle means and which is movable independently of said main valve element in response to a pressure drop when an increase in the rotational speed of said pump causes said pressurized fluid passing through said inlet passage to increase in volume, for closing said second throttle means.

2. A flow volume control device as set forth in claim 1, further comprising:
   a housing formed with a bore in which said main and auxiliary volume control means are received in tandem disposition and also formed with said inlet and bypass passage means, one end of each of which opens into said bore.

3. A flow volume control device as set forth in claim 2, wherein said main volume control means comprises:
   a main spool slidably received in said bore of said housing and operable as said main valve element; and
   a spring received in said bore of said housing for urging said main spool in a direction to restrict the flow of said excess part of the said pressurized fluid from said inlet passage means to said bypass passage means.

4. A flow volume control device as set forth in claim 2 or 3, wherein said auxiliary volume control means comprises:
   a sleeve fixedly inserted into said bore of said housing and formed with a spool chamber therein, said sleeve being further formed therein with said outlet passage means;
   an auxiliary spool slidably received in said spool chamber and operable as said auxiliary valve element for closing said second throttle means when said pressure drop attains a predetermined value; and a spring provided in said spool chamber for urging said auxiliary spool in a direction to open said second throttle means.

5. A flow volume control device as set forth in claim 4, wherein said second throttle means is formed in said sleeve to open to said spool chamber, further comprising:

a throttle plate secured to one end of said sleeve for defining said spool chamber in cooperation with said sleeve and formed thereon with said first throttle means for communication of said inlet passage means with said outlet passage means.

6. A flow volume control device as set forth in claim 5, wherein:

said throttle plate is further formed with a communication passage for fluidically connecting said inlet passage with one of two auxiliary chambers which are divided by said auxiliary spool in said spool chamber; and said housing and said sleeve are formed with leading passages for leading said pressurized fluid from said pump directly to the other of said two auxiliary chambers without passing through said inlet passage means.

7. A flow volume control device as set forth in claim 6, wherein:

said housing is further formed therein with a relief passage for leading a part of pressurized fluid, flowing to said outlet passage means, to one of two main chambers which are defined by said main control spool in said bore of said housing, the other of said two main chambers communicating with said inlet passage means.

8. A flow volume control device as set forth in claim 7, further comprising:

relief valve means incorporated in said main control spool for fluidically connecting said one of said two main chambers with said bypass passage means when the pressure of said pressurized fluid in said one of said two main chambers exceeds a preselected value.

* * * * *